(12) United States Patent
Okuda et al.

(10) Patent No.: US 10,286,492 B2
(45) Date of Patent: May 14, 2019

(54) WELDED STRUCTURE, LASER WELDING METHOD, AND LASER WELDING DEVICE

(71) Applicant: MITSUBISHI HEAVY INDUSTRIES, LTD., Tokyo (JP)

(72) Inventors: Takehisa Okuda, Tokyo (JP); Tadashi Itoyama, Tokyo (JP); Yasuyuki Fujiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 55 days.

(21) Appl. No.: 15/303,851

(22) PCT Filed: Apr. 10, 2015

(86) PCT No.: PCT/JP2015/061246
§ 371 (c)(1),
(2) Date: Oct. 13, 2016

(87) PCT Pub. No.: WO2015/159820
PCT Pub. Date: Oct. 22, 2015

(65) Prior Publication Data
US 2017/0036302 A1     Feb. 9, 2017

(30) Foreign Application Priority Data
Apr. 14, 2014   (JP) .................. 2014-082784

(51) Int. Cl.
*F16B 5/08*     (2006.01)
*F16B 5/00*     (2006.01)
(Continued)

(52) U.S. Cl.
CPC .......... *B23K 26/282* (2015.10); *B23K 9/0256* (2013.01); *B23K 9/167* (2013.01);
(Continued)

(58) Field of Classification Search
None
See application file for complete search history.

(56) References Cited

U.S. PATENT DOCUMENTS 3,246,116 A * 4/1966 Anderson ............... B21C 37/26
                                                     219/137 R
3,575,448 A * 4/1971 Licari ...................... F16B 5/08
                                                        403/272
(Continued)

FOREIGN PATENT DOCUMENTS

EP    2 047 935    4/2009
JP    1-258891    10/1989
(Continued)

OTHER PUBLICATIONS

Notification of Reasons for Refusal dated Jan. 16, 2018 in corresponding Japanese Patent Application No. 2014-082784, with English-language translation.
(Continued)

*Primary Examiner* — Ibrahime A Abraham
*Assistant Examiner* — Gyounghyun Bae
(74) *Attorney, Agent, or Firm* — Wenderoth, Lind & Ponack, L.L.P.

(57) ABSTRACT

A nozzle as a welded structure includes a nozzle body, and a buckling prevention fin joined to the nozzle body by laser welding, in which an end of the buckling prevention fin before laser welding is disposed to face the nozzle body, an installed state of the nozzle body and the buckling prevention fin includes an installed state in which a gap is formed between the nozzle body and the buckling prevention fin, and the buckling prevention fin has a beveled portion which is beveled at the end facing the nozzle body.

12 Claims, 7 Drawing Sheets

(51) Int. Cl.
| | | |
|---|---|---|
| B23K 26/282 | (2014.01) | |
| B23K 26/60 | (2014.01) | |
| B23K 9/167 | (2006.01) | |
| B23K 26/03 | (2006.01) | |
| B23K 26/08 | (2014.01) | |
| B23K 26/12 | (2014.01) | |
| B23K 26/14 | (2014.01) | |
| B23K 33/00 | (2006.01) | |
| B23K 26/211 | (2014.01) | |
| B23K 9/025 | (2006.01) | |
| B23K 26/242 | (2014.01) | |
| B23K 101/08 | (2006.01) | |
| B23K 103/04 | (2006.01) | |
| B23K 101/00 | (2006.01) | |

(52) U.S. Cl.
CPC ........ *B23K 26/032* (2013.01); *B23K 26/0884* (2013.01); *B23K 26/123* (2013.01); *B23K 26/14* (2013.01); *B23K 26/1464* (2013.01); *B23K 26/211* (2015.10); *B23K 26/242* (2015.10); *B23K 26/60* (2015.10); *B23K 33/006* (2013.01); *B23K 2101/001* (2018.08); *B23K 2101/08* (2018.08); *B23K 2103/04* (2018.08)

(56) References Cited

U.S. PATENT DOCUMENTS

| | | | | | |
|---|---|---|---|---|---|
| 3,874,067 | A | * | 4/1975 | Toyooka | B23K 20/129 156/296 |
| 4,213,024 | A | * | 7/1980 | Costley | B23K 9/0203 219/106 |
| 4,505,420 | A | * | 3/1985 | Wittenbach | F16L 13/0209 219/137 R |
| 4,611,830 | A | * | 9/1986 | von Ahrens | F16L 13/0227 219/60 R |
| 4,841,617 | A | * | 6/1989 | Schmidt | B21C 37/26 219/121.64 |
| 4,856,165 | A | * | 8/1989 | Reuchlein | B21C 37/24 29/890.046 |
| 4,983,808 | A | * | 1/1991 | Schmolke | D01G 15/88 219/121.64 |
| 5,195,578 | A | * | 3/1993 | Le Goff | B01D 1/065 122/39 |
| 5,430,270 | A | * | 7/1995 | Findlan | B23K 26/106 219/121.63 |
| 5,866,870 | A | * | 2/1999 | Walduck | B23K 28/02 219/121.45 |
| 6,147,317 | A | * | 11/2000 | Brundermann | B21C 37/26 219/61 |
| 6,373,024 | B1 | * | 4/2002 | Safarevich | A61N 1/05 219/121.64 |
| 6,705,489 | B2 | * | 3/2004 | Henry | B67D 1/005 222/129.1 |
| 7,007,910 | B1 | * | 3/2006 | Krinner | E04H 12/2215 248/156 |
| 7,065,875 | B2 | * | 6/2006 | Cai | B60G 21/0551 219/156 |
| 8,242,410 | B2 | * | 8/2012 | Peters | B23K 26/0676 219/121.63 |
| 8,367,961 | B2 | * | 2/2013 | Rainer | E02D 5/801 219/125.11 |
| 8,584,742 | B2 | * | 11/2013 | Usui | F28D 1/0477 165/150 |
| 8,732,951 | B2 | * | 5/2014 | Bruendermann | B21C 37/26 29/890.046 |
| 2001/0007331 | A1 | | 7/2001 | Iwago et al. | |
| 2014/0124489 | A1 | | 5/2014 | Zhang et al. | |

FOREIGN PATENT DOCUMENTS

| | | |
|---|---|---|
| JP | 6-23544 | 2/1994 |
| JP | 2001-259830 | 9/2001 |
| JP | 2002-62130 | 2/2002 |
| JP | 2006-224137 | 8/2006 |
| JP | 2012-101282 | 5/2012 |
| JP | 2012-152820 | 8/2012 |
| JP | 2013-6203 | 1/2013 |
| JP | 2014-4603 | 1/2014 |

OTHER PUBLICATIONS

International Search Report dated Jul. 14, 2015 in corresponding International Application No. PCT/JP2015/061246.
Written Opinion of the International Searching Authority dated Jul. 14, 2015 in corresponding International Application No. PCT/JP2015/061246.
Extended European Search Report dated Jun. 9, 2017 in corresponding European Application No. 15779930.5.

\* cited by examiner

WELDED STRUCTURE, LASER WELDING METHOD, AND LASER WELDING DEVICE

FIELD

The present invention relates to a welded structure manufactured by joining a workpiece and a fin member by laser welding, a laser welding method, and a laser welding device.

BACKGROUND

Hitherto, as a welded structure, laser welded-shaped steel has been known (for example, see Patent Literature 1). The laser welded-shaped steel is obtained, by melting and joining a T-shaped joint section, which is formed by being pressed perpendicularly to an end of a web material against a flange material made of a steel plate by one-pass irradiation with laser beam from one side.

CITATION LIST

Patent Literature

Patent Literature 1: Japanese Laid-open Patent Publication No. 2012-152820

SUMMARY

Technical Problem

The welded structure may be manufactured by joining the workpiece and the fin member by laser welding. When joining the workpiece and the fin member, as in Patent Literature 1, it is conceivable to perform the laser welding by pressing the end of the fin member against the surface of the workpiece. However, the fin member is not necessarily limited to being formed into a shape imitating the surface of the workpiece, and in some cases, a gap may be generated between the workpiece and the fin member due to a dimensional tolerance such as a machining error. In this case, although it is conceivable to provide more filler metals to fill the gap between the workpiece and the fin member, a heat input around the gap increases due to the feed of a large amount of filler metals. When the heat input increases, there is a possibility that a welded part formed between the workpiece and the fin member may become defective welding. Meanwhile, when adjusting the heat input around the gap to suppress the defective welding, since the welding conditions of the laser welding are changed in accordance with the gap, the welding operation is complicated.

Accordingly, an object of the present invention is to provide a welded structure that is capable of suitably joining the workpiece and the fin member by laser welding, without changing the welding conditions, even if a gap is generated, a laser welding method, and a laser welding device.

Solution to Problem

A welded structure of a present invention includes a workpiece, and a fin member joined to the workpiece by laser welding. An end of the fin member before laser welding is disposed to face the workpiece, and an installed state of the workpiece and the fin member includes an installed state in which a gap is formed between the workpiece and the fin member. The fin member has a beveled portion which is beveled at the end facing the workpiece.

Furthermore, a laser welding method of the present invention makes a workpiece and an end of a fin member face each other, and applies a laser beam between the workpiece and the fin member to join the workpiece and the fin member. An installed state between the workpiece and the fin member before laser welding includes an installed state in which a gap is formed between the workpiece and the fin member. The fin member has a beveled portion which is beveled at the end facing the workpiece.

According to this configuration, by the beveled portion which is beveled at the end of the fin member, a predetermined space is formed between the workpiece and the end of the fin member by the beveled portion, regardless of the presence or absence of the gap. That is, when the gap is not formed between the workpiece and the end of the fin member, a predetermined space is formed between the workpiece and the end of the fin member by the beveled portion. Further, when the gap is formed between the workpiece and the end of the fin member, a predetermined space is formed between the workpiece and the end of the fin member, by the gap and the beveled portion. Thus, since the predetermined space is formed between the workpiece and the end of the fin member regardless of the presence or absence of the gap, the variation in the feeding quantity of the filler metal required depending on the gap is suppressed, and the filler metal can be stably fed. Therefore, since the heat input due to the feeding of the filler metal is stable, it is possible to suppress an occurrence of defective welding. In addition, by the beveled portion which is beveled at the end of the fin member, the heat input of the laser beam emitted in the laser welding can be applied over the wide area between the workpiece and the end of the fin member. Therefore, it is possible to suppress the occurrence of defective welding due to the excessive heat input. Thus, even if the gap is generated, it is possible to suitably join the workpiece and the fin member by laser welding, without changing the welding conditions. Further, in the laser welding, the beveled portion may be welded in one pass, and the beveled portion may be welded in plural passes.

Furthermore, it is preferable that the fin member has a front side, a back side formed on an opposite side of the front side, an end surface of the end facing the workpiece, and a beveled surface of the beveled portion beveled at the end portion. It is preferable that a space area formed between the workpiece and the fin member is an area, in a cross-section perpendicular to the traveling direction of the laser welding, that is surrounded by a welding target surface of the workpiece facing the fin member, the end surface facing the welding target surface of the workpiece, the beveled surface of the beveled portion, a front side virtual surface extending to the workpiece side along the front side of the fin member, and a back side virtual surface extending to the workpiece side along the back side of the fin member. When a maximum space area in which the space area becomes the maximum is set as Emax, and a minimum space area in which the space area becomes the minimum is set as Emin, it is preferable that the beveled portion is beveled to satisfy the relation of $(E_{max}/E_{min}) \leq 5$.

According to this configuration, by the beveled portion which is beveled to satisfy the relation of $(E_{max}/E_{min}) \leq 5$, the variation in the feeding quantity of the filler metal required depending on the gap is further suppressed. Thus, the filler metal can be more stably fed.

Furthermore, when the thickness of the fin member in a thickness direction in which the front side and the back side of the fin member are connected with each other is set as "t", and a formation depth of the beveled portion from the end surface in a direction in which the workpiece and the fin member face each other is set as "a", it is preferable that the beveled portion is beveled to satisfy the relation of a≤t.

According to this configuration, in the direction in which the workpiece and the fin member face each other, a formation depth "a" of the beveled portion can be set to a depth that is equal to or less than a thickness "t" of the fin member. Therefore, in the direction in which the workpiece and the fin member face each other, the beveled portion does not excessively spread, and it is possible to provide a shape of the beveled portion in which the welded part is suitably easily formed.

Furthermore, when the thickness of the fin member in a thickness direction in which the front side and the back side of the fin member are connected with each other is set as t, and a formation depth of the beveled portion from the front side in the thickness direction is set as b, it is preferable that the beveled portion is beveled to satisfy the relation of b≥t/2.

According to this configuration, in the thickness direction of the fin member, the formation depth "b" of the beveled portion may be set to be equal to or greater than half of the thickness "t" of the fin member. Therefore, in the thickness direction of the fin member, the beveled portion does not become excessively shallow, and it is possible to provide a shape of the beveled portion in which the welded part is suitably easily formed.

Furthermore, it is preferable that the workpiece is a conical nozzle body having an outer circumferential surface, and the fin member is an annular sheet metal member that is disposed along the outer circumferential surface of the nozzle.

According to this configuration, the annular fin member before the laser welding is disposed along the outer circumferential surface of the nozzle body. At this time, the nozzle body and the fin member have a configuration in which the gap formed therebetween is hard to fill. That is, if the gap is formed between the nozzle body and the fin member, even when the fin member is brought close to one side in the radial direction of the nozzle so as to fill the gap, since the gap on the other side in the radial direction spreads, it is difficult to eliminate the gap. Even in the nozzle body and fin member having the configuration that is hard to eliminate the gap, the predetermined space is formed by the beveled portion, regardless of the presence or absence of the gap. Thus, it is possible to suitably join the nozzle body and the fin member by laser welding, without changing the welding conditions.

Furthermore, it is preferable that the laser beam emitted to the beveled portion in the laser welding is set such that an angle formed between an irradiation direction of the laser beam and the welding target surface of the workpiece is smaller than an angle formed between the irradiation direction of the laser beam and the front side of the fin member.

According to this configuration, the laser beam can be emitted toward the beveled portion along the welding target surface side of the workpiece. Therefore, it is possible to join the fin member to the workpiece, while suppressing the heat input to the workpiece. Further, unless a physical interference occurs between the laser irradiator for emitting the laser beam and the workpiece, it is preferable that the angle formed between the laser beam and the welding target surface is reduced as much as possible.

Furthermore, it is preferable that the laser beam emitted to the beveled portion in the laser welding is emitted in a predetermined irradiation range on a front side virtual surface extending to the workpiece side along the surface of the fin member, and the predetermined irradiation range is a range, in a cross-section perpendicular to the traveling direction of the laser welding, from the center of the front side virtual surface in the direction in which the workpiece and the fin member face each other to the fin member side.

According to this configuration, it is possible to emit the laser beam within the predetermined irradiation range. Therefore, it is possible to join the fin member to the workpiece, while suppressing the heat input to the workpiece.

Furthermore, it is preferable that a filler metal used in the laser welding uses the same material as the workpiece.

According to this configuration, it is possible to join the fin member to the workpiece, using the filler metal made of the same material as the workpiece. Therefore, the durable temperature of the workpiece and the welded part formed between the workpiece and the fin member can be set to the same temperature. Further, the fin member may also be the same material as the workpiece and the filler metal.

Furthermore, it is preferable that the filler metal used in the laser welding is fed such that, when the gap becomes the maximum, the welded part formed between the workpiece and the fin member has the same height as the front side of the fin member.

According to this configuration, when the gap becomes the maximum, the welded part formed between the workpiece and the fin member can be set to the same height as the front side of the fin member. Meanwhile, at the time of the minimum clearance in which the gap becomes the minimum, the welded part formed between the workpiece and the fin member enters an overlaying state to be higher than the front side of the fin member. Therefore, at the maximum clearance of the gap, it is possible to suitably form the welded part, without insufficiency of the filler metal fed to the beveled portion. Further, since the welded part formed by the filler metal fed to the beveled portion can function as an overlay welded part at the time of the minimum clearance, it is possible to firmly join the workpiece and the fin member.

Furthermore, it is preferable that at the time of laser welding of the workpiece and the fin member, the beveled portion is irradiated with the laser beam, and on an opposite side of the irradiation side irradiated with the laser beam with the beveled portion interposed therebetween, a back shield filled with inert gas is formed.

According to this configuration, it is possible to suitably form the welded part, without oxidation of the welded part formed between the workpiece and the fin member.

Furthermore, it is preferable that the laser welding is penetration welding.

According to this configuration, it is possible to form the welded part to penetrate from the front side to the back side of the fin member, and it is possible to form a back wave on the back side of the welded part.

Furthermore, welding with no welding rod is performed on the welded part formed between the workpiece and the fin member by the laser welding, from the opposite side of the irradiation side of the laser beam emitted at the laser welding.

According to this configuration, by performing the welding with no welding rod on the welded part on the opposite side of the irradiation side, the welded part can have a uniform shape. Further, the welding with no welding rod may be a decorative overlay welding using the filler metal, and may be welding with no welding rod without using the filler metal. Further, it is preferable that the welding with no welding rod is performed by lowering the output of the laser beam compared with the laser welding, and for example, may be performed by the half output or less.

A laser welding device of the present invention makes a workpiece and an end of a fin member face each other, and applies a laser beam between the workpiece and the fin member, and joins the workpiece and the fin member to manufacture the above-described welded structure.

According to this configuration, even if the gap is generated between the workpiece and the fin member, it is possible to suitably join the workpiece and the fin member by laser welding, without changing the welding conditions.

DESCRIPTION OF EMBODIMENTS

Embodiments according to the present invention will be described below in detail with reference to the drawings. The invention is not limited by the embodiments. In addition, the constituent elements in the following embodiments include those that are easily replaceable by a person having ordinary skill in the art or substantially the same things. Furthermore, the constituent elements described below can be combined as appropriate, and if there is a plurality of embodiments, it is also possible to combine the respective embodiments.

EMBODIMENT

Figure 1:
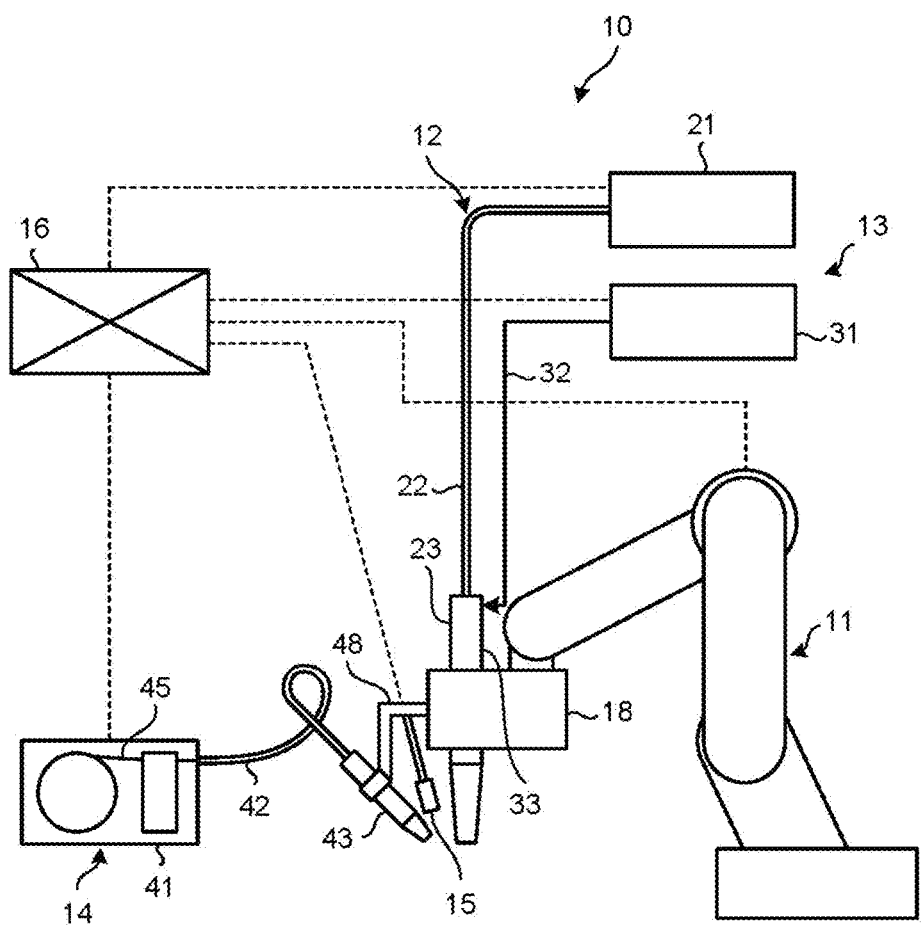
FIG. 1 is a schematic structural diagram schematically illustrating a laser welding device according to the present embodiment.
Figure 2:
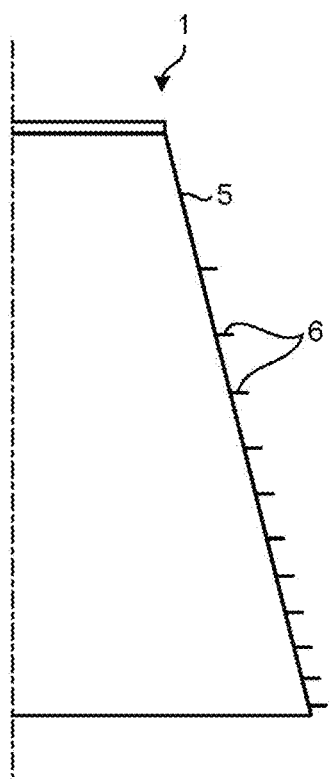
FIG. 2 is a cross-sectional view illustrating a half portion of a nozzle according to the present embodiment.
Figure 3:
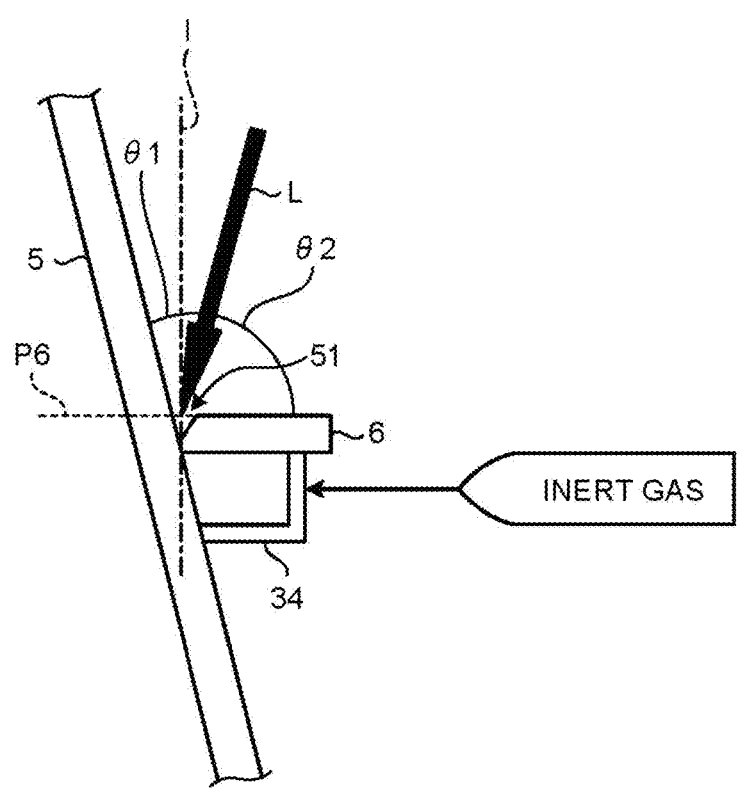
FIG. 3 is a cross-sectional view illustrating main portions of the nozzle before laser welding.
Figure 4:
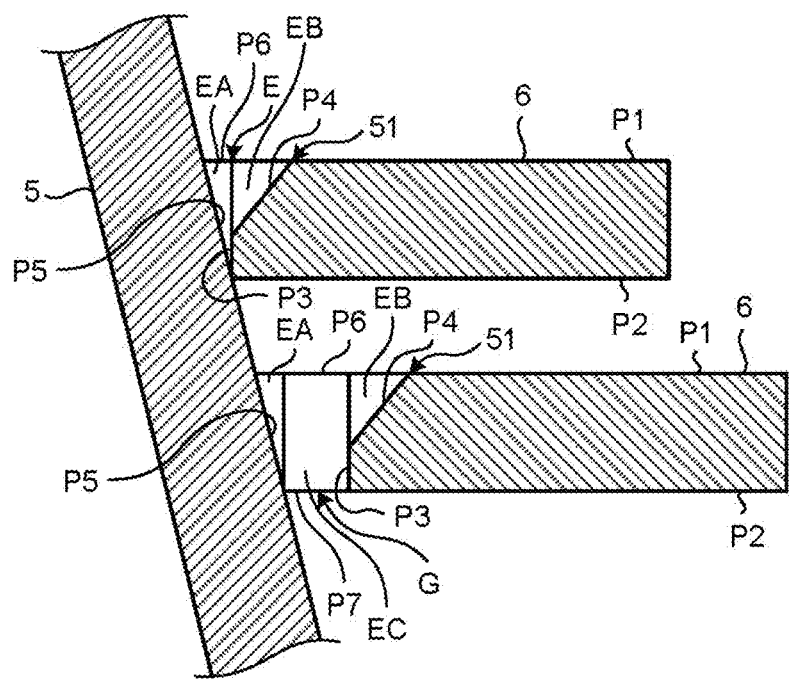
FIG. 4 is an explanatory view illustrating a gap area of the gap in the nozzle.
Figure 5:
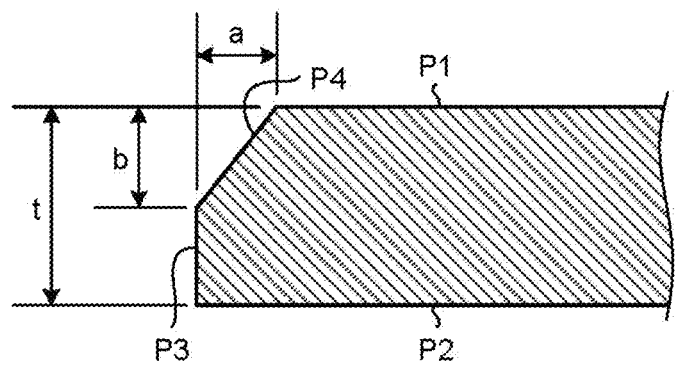
FIG. 5 is an explanatory view illustrating a dimension of a buckling prevention fin.
Figure 6:
FIG. 6 is a cross-sectional view of an example of the welded part which is formed in accordance with the gap.
Figure 7:
FIG. 7 is a cross-sectional view of an example of the welded part which is formed in accordance with the gap.
Figure 8:
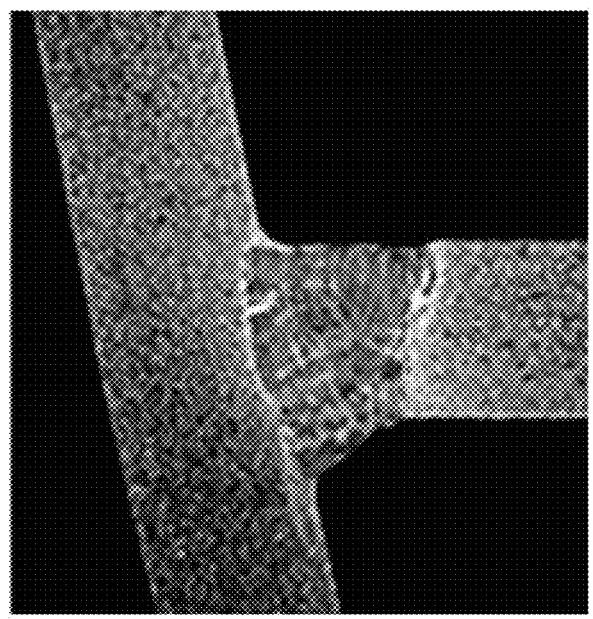
FIG. 8 is a cross-sectional view of an example of a welded part which is formed in accordance with the gap.
Figure 9:
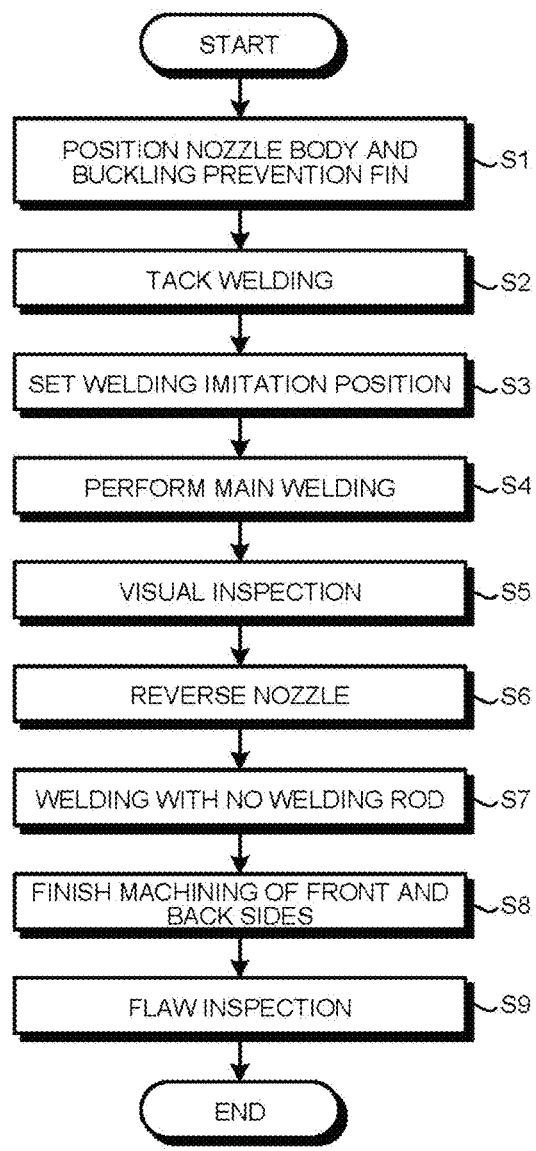
FIG. 9 is a flowchart illustrating a welding operation of a laser welding method according to the present embodiment.

FIG. 1 is a schematic structural diagram schematically illustrating a laser welding device according to the present embodiment. FIG. 2 is a cross-sectional view illustrating a half portion of a nozzle according to the present embodiment. FIG. 3 is a cross-sectional view illustrating main portions of the nozzle before laser welding. FIG. 4 is an explanatory view illustrating a gap area of the gap in the nozzle. FIG. 5 is an explanatory view illustrating a dimension of a buckling prevention fin. FIG. 6 is a cross-sectional view of an example of the welded part which is formed in accordance with the gap. FIG. 7 is a cross-sectional view of an example of the welded part which is formed in accordance with the gap. FIG. 8 is a cross-sectional view of an example of a welded part which is formed in accordance with the gap. FIG. 9 is a flowchart illustrating a welding operation of a laser welding method according to the present embodiment.

A welded structure according to the present embodiment is, for example, a nozzle 1 of a rocket, and is a welding target using a laser welding device 10 illustrated in FIG. 1. First, before describing the laser welding device 10, the nozzle 1 as a welding target will be described with reference to FIG. 2.

As illustrated in FIG. 2, combustion gas injected toward the outside circulates inside a nozzle 1. The nozzle 1 has a nozzle body (a workpiece) 5, and a buckling prevention fin (a fin member) 6 which is joined to an outer circumferential surface (a welding target surface) of the nozzle body 5.

The nozzle body 5 is formed into a cylindrical body of a substantially conical shape that spreads toward a downstream side from an upstream side in a circulation direction of the combustion gas, and the combustion gas circulates along an axial direction thereof. Here, since the combustion gas circulates inside the nozzle body 5, the interior of the nozzle body 5 is depressurized. Therefore, an internal pressure of the nozzle body 5 becomes lower than an external pressure thereof.

The buckling prevention fin 6 is an annular plate member, and is provided over the entire circumference along the circumferential direction of the outer circumferential surface of the nozzle body 5. The buckling prevention fin 6 is a member that prevents buckling of the nozzle body 5. That is, since the internal pressure of the nozzle body 5 becomes lower than the external pressure, the buckling prevention fin 6 serves as a reinforcing member for preventing the nozzle body 5 from being buckled inward.

Further, the buckling prevention fin 6 is a sheet metal member which is formed by sheet metal machining. Specifically, the buckling prevention fin 6 is formed by joining both ends of the plate material formed in a semi-arc shape by pressing the steel plate. A plurality of buckling prevention fins 6 is provided side by side along the axial direction of the nozzle body 5 at predetermined intervals. At this time, since the nozzle body 5 has a conical shape, the plurality of buckling prevention fins 6 has different diameters from each other. Here, in the buckling prevention fins 6, a surface of one side (an upper side in FIGS. 2 and 3) in the axial direction of the nozzle body 5 is a front side, and a surface of the other side (a lower side in FIGS. 2 and 3) in the axial direction of the nozzle body 5 is a back side.

The buckling prevention fins 6 are fitted to the outer circumferential surface of the nozzle body 5, before the laser welding. Therefore, the nozzle body 5 and the buckling prevention fins 6 before laser welding are in an installed state in which the outer circumferential surface of the nozzle body 5 and the end of the inner circumferential side of the buckling prevention fins 6 face each other. In the installed state, parts between the nozzle body 5 and the buckling prevention fins 6 are welded by a laser welding device 10 to be described below. Here, the nozzle body 5 and the buckling prevention fins 6 are made up of the same material.

Next, the laser welding device 10 will be described referring to FIG. 1. The laser welding device 10 is equipped with a manipulator 11 serving as a moving mechanism, a laser irradiator 12, a shield gas feeder 13, a wire feeder 14, a camera 15 and a controller 16.

The manipulator 11 is, for example, a six-axis manipulator, and a support frame 18 is attached to a tip portion thereof. A laser irradiation head 23 to be described later which is a part of the laser irradiator 12 is held by the support frame 18. The manipulator 11 is connected to the controller 16, and by controlling its operation by the controller 16, it is possible to change an irradiation direction and an irradiation position of the laser beam emitted from the laser irradiator 12.

The laser irradiator 12 has a laser oscillator 21, and the laser irradiation head 23 connected to the laser oscillator 21 by a transmission cable 22. The laser oscillator 21 emits a laser beam, and is connected to the controller 16. The laser oscillator 21 emits the laser beam to be a predetermined output, by controlling the irradiation with the laser beam using the controller 16. The transmission cable 22 guides the laser beam emitted from the laser oscillator 21 toward the laser irradiation head 23. The laser irradiation head 23 emits the laser beam guided by the transmission cable 22 toward the nozzle 1 to be welded. The laser irradiation head 23 is held by the support frame 18. Further, since the laser irradiation head 23 is integrated with a part (a shield gas injection nozzle 33 to be described later) of the shield gas feeder, the shield gas and the laser beam are injected together.

Here, as illustrated in FIG. 3, a laser beam L emitted from the laser irradiator 12 is applied between the nozzle body 5 and the buckling prevention fins 6. Specifically, the laser beam L is emitted from the side in which the angle formed between the outer circumferential surface of the nozzle body 5 and the buckling prevention fins 6 is large. That is, the angle formed between the outer circumferential surface of the nozzle body 5 and the front side of the buckling prevention fins 6 is larger than the angle formed between the outer circumferential surface of the nozzle body 5 and the back side of the buckling prevention fins 6. Therefore, the front side of the buckling prevention fin 6 serves as the irradiation side of the laser beam L.

The shield gas feeder 13 has a shield gas feeding unit 31, and the shield gas injection nozzle 33 connected to the shield gas feeding unit 31 by a shield gas feeding line 32. The shield gas feeding unit 31 feeds the inert gas, and is connected to the controller 16. The shield gas feeding unit 31 feeds the inert gas at a predetermined feeding quantity, by controlling the feeding of the inert gas by the controller 16. The shield gas feeding line 32 allows the inert gas fed from the shield gas feeding unit 31 to circulate toward the shield gas injection nozzle 33. Since the shield gas injection nozzle 33 is integrated with the laser irradiation head 23 as described above, the shield gas injection nozzle 33 is held by the support frame 18. The shield gas injection nozzle 33 injects the shield gas toward the welding position to which the laser beam is emitted.

Further, as illustrated in FIG. 3, the shield gas feeder 13 is interposed between the nozzle body 5 and the buckling prevention fins 6 to form a back shield on the side opposite to the irradiation side of the laser beam L. Specifically, the shield gas feeder 13 has a shield cover 34 that covers a space between the nozzle body 5 and the buckling prevention fin 6, on the side opposite to the irradiation side of the laser beam L. One end of the shield cover 34 abuts against the outer circumferential surface of the nozzle body 5, and the other end thereof abuts against the back side of the buckling prevention fin 6. Further, the shield gas feeder 13 feeds the inert gas toward the interior of the shield cover 34 from the shield gas feeding unit 31 via a shield gas feeding line (not illustrated). Thus, the interior of the shield cover 34 is filled with the inert gas, and thus, the back shield is formed.

The wire feeder 14 includes a wire reel unit 41, and a wire nozzle 43 that is connected to the wire reel unit 41 by a wire feeding line 42. The wire reel unit 41 feeds a welding wire (filler metal) 45 and is connected to the controller 16. The wire reel unit 41 feeds the welding wire 45 at a predetermined feed rate, by controlling the feeding of the welding wire 45 using the controller 16. The wire feeding line 42 feeds the welding wire 45 fed from the wire reel unit 41 toward the wire nozzle 43. The wire nozzle 43 is held by a support member 48 which protrudes from the support frame 18, and guides the welding wire 45 toward the welding position irradiated with the laser beam. At this time, the welding wire 45 is made of the same material as the nozzle body 5 and the buckling prevention fin 6.

The camera 15 is mounted to the support member 48 to image the welding position irradiated with the laser beam. The camera 15 is connected to the controller 16, and outputs the imaging data obtained by imaging the welding position toward the controller 16. The controller 16 controls the operation of the manipulator 11, based on the imaging data imaged with the camera 15.

Here, since the laser irradiation head 23, the shield gas injection nozzle 33, the wire nozzle 43 and the camera 15 are integrally supported by the support frame 18 and the support member 48, the relative positional relation is fixed. Accordingly, by moving the support member 48, the manipulator 11 can integrally move the irradiation direction and the irradiation position of the laser beam using the laser irradiator 12, the feeding position of the inert gas using the shield gas injection nozzle 33, the guidance position of the welding wire 45 using the wire nozzle 43 and the imaging position of the camera 15.

By controlling the operation of the manipulator 11 based on the imaging data imaged with the camera 15, the controller 16 adjusts the irradiation direction and the irradiation position of the laser beam using the laser irradiator 12, the feeding position of the inert gas using the shield gas injection nozzle 33, the guidance position of the welding wire 45 using the wire nozzle 43, and the imaging position of the camera 15.

The laser welding device 10 thus configured emits the laser beam toward the part between the nozzle body 5 and the buckling prevention fins 6 fitted to the outer circumferential surface of the nozzle body 5, from the front side of the buckling prevention fin 6. Further, the laser welding device 10 performs welding, while moving the laser beam along the part between the nozzle body 5 and the buckling prevention fins 6 fitted to the outer circumferential surface of the nozzle body 5, based on the circumferential direction of the nozzle body 5 as a traveling direction.

Here, since the buckling prevention fins 6 fitted to the outer circumferential surface of the nozzle body 5 are metal plate members, before the laser welding, it is difficult to accurately form the buckling prevention fins 6 to imitate the outer circumferential surface of the nozzle body 5. Therefore, a gap G may occur between the outer circumferential surface of the nozzle body 5 and the end of the inner circumferential side of the buckling prevention fin 6. That is, the installed state of the nozzle body 5 and the buckling prevention fins 6 includes an installed state in which the gap G is formed between the nozzle body 5 and the buckling prevention fins 6, and an installed state in which the gap G is not formed between the nozzle body 5 and the buckling prevention fins 6.

Meanwhile, in order to simplify the welding operation, the nozzle body 5 and the buckling prevention fins 6 are joined to each other, without changing the welding conditions of the laser welding device 10. Therefore, in the present embodiment, a beveled portion 51 is beveled at the end of the inner circumferential side of the buckling prevention fin 6 before the laser welding. Hereinafter, the shape of the beveled portion 51 of the buckling prevention fin 6 will be described with reference to FIGS. 4 and 5.

As illustrated in FIG. 4, the beveled portion 51 of the buckling prevention fin 6 is formed by beveling the edge of the front side P1 side in a tapered shape at the end of the inner circumferential side. Thus, a beveled surface P4 of the beveled portion 51 formed by being beveled becomes a tapered surface. The beveled surface P4 is a surface which intersects with an end surface P3 of the inner circumferential side end of the buckling prevention fins 6, and the front side P1 of the buckling prevention fins 6. The buckling prevention fins 6 having the beveled portion 51 are disposed such that the end surface P3 of the buckling prevention fin 6 faces the outer circumferential surface P5 of the nozzle body 5 having a tapered shape in a non-parallel state. That is, the end surface P3 of the buckling prevention fin 6 is diagonal to the outer circumferential surface P5 of the nozzle body 5.

Here, as illustrated in FIG. 4, a space area E between the nozzle body 5 and the buckling prevention fin 6 is an area that is surrounded by a predetermined surface in a cross-section perpendicular to the traveling direction (a circumferential direction of the nozzle body 5) of the laser welding. Specifically, the space area E is an area that is surrounded by the outer circumferential surface P5 of the nozzle body 5, the end surface P3 of the buckling prevention fin 6, the beveled surface P4 of the beveled portion 51, a front side virtual surface P6 extending to the nozzle body 5 side along the front side P1 of the buckling prevention fin 6, and a back side virtual surface P7 extending to the nozzle body 5 side along the back side P2 of the buckling prevention fin 6.

The space area E is an area that includes a first space area EA formed by the outer circumferential surface P5 of the nozzle body 5 and the end surface P3 of buckling prevention fin 6, a second space area EB formed by the shape of the beveled portion 51, and a third space area EC formed by the gap G.

The outer circumferential surface P5 of the nozzle body 5 is diagonal to the axial direction of the nozzle body 5, and meanwhile, the end surface P3 of the buckling prevention fin 6 is a surface extending along the axial direction of the nozzle body 5. Thus, the first space area EA is an area in which there is no change. Specifically, the first space area EA is a triangular area that is surrounded by the outer circumferential surface P5 of the nozzle body 5, the front side virtual surface P6 and the end surface P3 of the buckling prevention fin 6, in a state in which the buckling prevention fin 6 abuts against the nozzle body 5.

The second space area EB is an area that is changeable by the shape of the beveled portion 51. Specifically, the second space area EB is a triangular area that is surrounded by the front side virtual surface P6, the beveled surface P4 and a surface extending along the end surface P3.

The third space area EC is an area that is changeable by the length of the gap G to be formed. Specifically, the gap G is a gap formed between the nozzle body 5 and the buckling prevention fin 6, in a radial direction perpendicular to the axial direction of the nozzle body, and specifically, the gap G is a gap formed between the outer circumferential surface P5 of the nozzle body 5 and the back side P2 of the buckling prevention fin 6. That is, there is a state in which no gap G is formed (gap G is zero) between the buckling prevention fin 6 as illustrated in the upper side of FIG. 4 and the nozzle body 5. Meanwhile, there is a state in which the gap G is formed between the buckling prevention fin 6 illustrated on the lower side of FIG. 4 and the nozzle body 5.

Here, when the gap G becomes the maximum, the space area E becomes a maximum space area, and meanwhile, when the gap G is zero (the upper view of FIG. 4), the space area E becomes a minimum space area. At this time, when the maximum space area is set as Emax, and the minimum space area is set as Emin, the beveled portion 51 is beveled so as to satisfy the relation of (Emax/Emin)≤5. That is, the beveled portion 51 is beveled so that the maximum space area Emax becomes equal to or less than 5 times the minimum space area Emin.

Next, the shape of the beveled portion 51 will be illustrated referring to FIG. 5. As described above, the beveled surface P4 of the beveled portion 51 is formed into a tapered surface. At this time, the thickness of the buckling prevention fin 6 in the thickness direction of connecting the front side P1 and the back side P2 of the buckling prevention fin 6 is set as "t", and the formation depth from the end surface P3 of the buckling prevention fin 6 is set as "a". The formation depth "a" is the depth of the deepest portion in a direction (the radial direction of the nozzle body 5) in which the nozzle body 5 and the buckling prevention fins 6 face each other. In this case, the beveled portion 51 is beveled to satisfy the relation of a≤t. That is, the formation depth "a" of the beveled portion 51 is beveled to be a depth equal to or less than the thickness "t" of the buckling prevention fin 6.

In addition, a formation depth from the front side P1 of the buckling prevention fin 6 is set as "b". The formation depth "b" is a depth of the deepest portion in the thickness direction of the buckling prevention fin 6. In this case, the beveled portion 51 is beveled to satisfy the relation of b≤t/2. That is, the formation depth of the beveled portion 51 is beveled to be a depth equal to or greater than a half of thickness "t" of the buckling prevention fin 6.

Next, referring to FIG. 3, the irradiation conditions of the laser beam L applied between the nozzle body 5 and the buckling prevention fin 6 having the beveled portion 51 formed as described above will be described. The laser beam L has an output that is capable of performing penetration welding of the nozzle body 5 and the buckling prevention fins 6. Further, as illustrated in FIG. 3, in a cross-section perpendicular to the traveling direction (the circumferential direction of the nozzle body 5) of the laser beam L, an angle θ1 formed between the irradiation direction of the laser beam L and the outer circumferential surface P5 of the nozzle body 5 is an angle that is smaller than an angle θ2 formed between the irradiation direction of the laser beam L and the front side P1 of the buckling prevention fin 6.

Further, the laser beam L as illustrated in FIG. 3 is emitted to a predetermined irradiation range on the front side virtual surface P6. The predetermined irradiation range is a range from the center (a dashed line I) of the front side virtual surface P6 between the outer circumferential surface P5 of the nozzle body 5 and the buckling prevention fin 6 in the radial direction of the nozzle body 5 to the buckling prevention fin 6 side on the front side virtual surface P6, in the cross-section perpendicular to the traveling direction (the circumferential direction of the nozzle body 5) of the laser beam L.

Further, the laser welding device 10 applies laser beam L between the nozzle body 5 and the buckling prevention fin 6, without changing the welding conditions of the laser welding, that is, the output of the laser beam L, the feeding quantity of the welding wire 45, the welding speed or the like.

Next, the welded part formed between the nozzle body 5 and the buckling prevention fin 6 after laser welding will be described with reference to FIGS. 6 to 8. Here, FIG. 6 is a diagram of a welded part that is formed when a gap G between the nozzle body 5 and the buckling prevention fin 6 is zero. FIG. 8 is a diagram of the welded part that is formed when the gap G between the nozzle body 5 and the buckling prevention fin 6 is the maximum. FIG. 7 is a diagram of the welded part that is formed when the gap G between the nozzle body 5 and the buckling prevention fin 6 becomes the gap G between FIGS. 6 and 8.

Here, as illustrated in FIG. 8, when the gap G becomes the maximum (in the case of the maximum space area Emax), the welding wire 45 fed between the nozzle body 5 and the buckling prevention fin 6 is fed so that the welded part formed between the nozzle body 5 and the buckling prevention fin 6 has the same height as the front side P1 of the buckling prevention fin 6. Meanwhile, since the feeding quantity of the welding wire 45 to be fed does not change regardless of the presence or absence of the gap G, as illustrated in FIG. 6, when the gap G is zero (in the case of the minimum space area Emin), the welded part formed between the nozzle body 5 and the buckling prevention fin 6 is formed to rise from the front side P1 of the buckling prevention fin 6. That is, in the case of the minimum space area Emin, the welded part formed between the nozzle body 5 and the buckling prevention fin 6 is subjected to the overlay welding.

Further, as illustrated in FIGS. 6 to 8, the welded part formed between the nozzle body 5 and the buckling prevention fins 6 was checked to be suitably formed, regardless of the presence or absence of the gap G, even when not changing the welding conditions of the laser welding device 10.

Next, the welding operation for welding the nozzle body 5 and the buckling prevention fin 6 will be described with reference to FIG. 9. First, before performing the welding by the laser welding device 10, the annular buckling prevention fin 6 is fitted to the outer circumferential surface of the nozzle body 5, and the nozzle body 5 and the buckling prevention fin 6 are positioned (step S1). Thereafter, the nozzle body 5 and the buckling prevention fin 6 are tack-welded by a TIG welding or the like (step S2).

Subsequently, a welding imitating position of the laser welding device 10 is set with respect to the nozzle body 5 and the buckling prevention fin 6 subjected to the tack-welding (step S3). That is, the irradiation direction, the irradiation position, the traveling direction and the like of laser beam L in the laser welding device 10 are set so that the laser beam L emitted from the laser welding device 10 moves to imitate the outer circumferential surface P5 of the nozzle body 5, along the part between the nozzle body 5 and the buckling prevention fin 6 subjected to the tack-welding.

The laser welding device 10 performs main welding in accordance with the welding imitation position set in step S3 (step S4). In step S4, the laser welding device 10 performs the laser welding, without changing the welding conditions, and while satisfying the irradiation direction and the irradiation range of the laser beam L illustrated in FIG. 3. Further, in step S4, since the penetration welding is performed between the nozzle body 5 and the buckling prevention fin 6, in the welded part formed between the nozzle body 5 and the buckling prevention fin 6, a back wave is formed on the back side P2 side of the buckling prevention fin 6. A visual inspection of the nozzle 1 after the laser welding in which the nozzle body 5 and the buckling prevention fin 6 are integrated is performed by the visual inspection or the like (step S5).

After the completion of the visual inspection, the position state of the nozzle 1 is reversed from the welding position state of step S4 (step S6). That is, in step S4, when the front side P1 side of the buckling prevention fin 6 is an upper side and the back side P2 side is a lower side, the nozzle 1 is reversed such that the front side P1 side of the buckling prevention fin 6 becomes the lower side and the back side P2 side becomes the upper side.

The laser welding device 10 performs welding with no welding rod on the inverted nozzle 1 from the back side P2 side of the buckling prevention fin 6, between the nozzle body 5 and the buckling prevention fins 6, that is, on the back side of the welded part formed by laser welding (step S7). The laser welding device 10 sets the back wave formed on the back side P2 side of the buckling prevention fins 6 to a uniform state, by performing the welding with no welding rod. Further, the welding with no welding rod may be a decorative overlay welding using the welding wire 45, and may be welding with no welding rod using no welding wire 45. Further, the welding with no welding rod is suitably performed by lowering the output of the laser beam L than the laser welding in step S4, and for example, may be performed by the half output or less.

The nozzle 1 after the welding with no welding rod is subjected to finish machining on the front side P1 side and the back side P2 side of the buckling prevention fin 6 (step S8). In the nozzle 1 subjected to the finish machining, the quality of the nozzle 1 is evaluated by the flaw inspection such as an ultrasonic flaw inspection (step S9).

As described above, according to the present embodiment, by the beveled portion 51 which is beveled at the end of the buckling prevention fin 6, a predetermined space (space area E) is formed between the nozzle body 5 and the buckling prevention fins 6 by the beveled portion 51, regardless of the presence or absence of the gap. That is, when the gap G is not formed between the nozzle body 5 and the end of the buckling prevention fin 6, predetermined spaces (the first space area EA and the second space area EB) are formed between the nozzle body 5 and the end of the buckling prevention fin 6 by the beveled portion 51. Further, when the gap G is formed between the nozzle body 5 and the end of the buckling prevention fin 6, between the nozzle body 5 and the end of the buckling prevention fin 6, predetermined spaces (the first space area EA, the second space area EB, and the third space area EC) are formed by the gap G and the beveled portion 51. Thus, since the predetermined spaces are formed between the nozzle body 5 and the end of the buckling prevention fin 6 regardless of the presence or absence of the gap G, the variation in the feeding quantity of the welding wire 45 required depending on the gap G is suppressed, and the welding wire 45 can be stably fed. Therefore, since the heat input due to the feeding of welding wire 45 is stable, it is possible to suppress an occurrence of defective welding. In addition, by the beveled portion 51 which is beveled at the end of the buckling prevention fin 6, the heat input of the laser beam emitted in the laser welding can be applied over the wide area between the nozzle body 5 and the end of the buckling prevention fin 6. Therefore, the laser welding device 10 can suppress the occurrence of defective welding due to the excessive heat input. From the above, even if the gap G is generated, it is possible to suitably join the nozzle body 5 and the buckling prevention fin 6 by laser welding, without changing the welding conditions. In the laser welding, the beveled portion 51 may be welded in one pass, and the beveled portion 51 may be welded in plural passes.

Further, according to the present embodiment, by the beveled portion 51 which is beveled to satisfy the relation of (Emax/Emin)≤5, the variation in the feeding quantity of the filler metal required depending on the gap G is suppressed. Thus, it is possible to more appropriately suppress the variation of the welding wire 45 to be fed toward the beveled portion 51, and the welding wire 45 can be more stably fed.

Further, according to the present embodiment, the beveled portion 51 can be beveled to satisfy the relation of a≤t. Therefore, the beveled portion 51 is not formed to be excessively spread in the radial direction of the nozzle body 5, and it is possible to provide the shape of the beveled portion 51 in which the welded part is suitably easily formed.

Further, according to the present embodiment, the beveled portion 51 can be beveled to satisfy the relation of b≥t/2. Therefore, the beveled portion 51 is not to be excessively shallow in the thickness direction of the buckling prevention fins 6, and it is possible to provide the shape of the beveled portion 51 in which the welded part is suitably easily formed.

Further, according to the present embodiment, by forming the beveled portion 51 in the buckling prevention fin 6, it is possible to suitably join the nozzle body 5 and the buckling prevention fin 6 by laser welding, even in the conical nozzle body 5 and the annular buckling prevention fin 6 that are hard to fill the gap G, without changing the welding conditions.

Further, according to the present embodiment, the angle θ1 can be set to be smaller than the angle θ2. Therefore, the laser beam L can be emitted toward the beveled portion 51 along the outer circumferential surface P5 side of the nozzle body 5. Therefore, it is possible to join the buckling prevention fin 6 to the nozzle body 5, while suppressing the heat input to the nozzle body 5. Further, unless a physical interference occurs between the laser irradiator 12 for emitting the laser beam L and the nozzle body 5, it is preferable that the angle θ1 is suitably reduced as much as possible.

Further, according to the present embodiment, the laser welding device 10 can emit the laser beam L in the range from the center of the front side virtual surface P6 to the buckling prevention fin 6 side. Therefore, it is possible to join the buckling prevention fin 6 to the nozzle body 5, while suppressing the heat input to the nozzle body 5.

Further, according to the present embodiment, it is possible to join the buckling prevention fin 6 to the nozzle body 5, using the welding wire 45 made of the same material as the nozzle body 5 and the buckling prevention fin 6. Therefore, the durable temperature of the nozzle body 5 and the welded part can be set to the same temperature. Further, the welding wire 45 may be at least the same material as the nozzle body 5.

Further, according to the present embodiment, when the gap G becomes the maximum (when becoming the maximum space area Emax), the welded part formed between the nozzle body 5 and the buckling prevention fin 6 can be set to the same height as the front side P1 of the buckling prevention fin 6. Therefore, it is possible to suitably form the welded part at the maximum clearance of the gap G, without insufficiency of the welding wire 45 to be fed to the beveled portion 51. Further, since the welded part formed between the nozzle body 5 and the buckling prevention fin 6 at the minimum clearance can be made to function as an overlay welded part, it is possible to firmly join the nozzle body 5 and the buckling prevention fin 6.

Further, according to the present embodiment, it is possible to form a back shield filled with the inert gas, on the opposite side of the irradiation side of the laser beam L with the beveled portion 51 interposed therebetween. Therefore, it is possible to suitably form the welded part, without oxidation of the welded part formed between the nozzle body 5 and the buckling prevention fin 6.

Further, according to the present embodiment, since the laser welding is the penetration welding, the welded part can be formed to penetrate from the front side P1 to the back side P2 of the buckling prevention fin 6, and the back wave can be formed on the back side P2 side of the welded part.

Further, according to the present embodiment, by performing the welding with no welding rod on the back wave formed on the back side P2 side of the welded part, the welded part can be provided in a uniform shape.

In the present embodiment, although the nozzle body 5 as the workpiece was the conical nozzle body 5, the shape of the nozzle body 5 is not particularly limited, and for example, may be a cylindrical shape. In this case, since the outer circumferential surface P5 of the nozzle body 5 is parallel to the end surface P3 of the buckling prevention fin 6, the first space area EA is zero. However, the beveled portion 51 can be formed to satisfy the relation of (Emax/Emin)≤5.

REFERENCE SIGNS LIST

1 NOZZLE
5 NOZZLE BODY
6 BUCKLING PREVENTION FIN
10 LASER WELDING DEVICE
11 MANIPULATOR
12 LASER IRRADIATOR
13 SHIELD GAS FEEDER
14 WIRE FEEDER
15 CAMERA
16 CONTROLLER
18 SUPPORT FRAME
21 LASER OSCILLATOR
22 TRANSMISSION CABLE
23 LASER IRRADIATION HEAD
31 SHIELD GAS FEEDER
32 SHIELD GAS FEEDING LINE
33 SHIELD GAS INJECTION NOZZLE
34 SHIELD COVER
41 WIRE REEL PART
42 WIRE FEEDING LINE
43 WIRE NOZZLE
45 WELDING WIRE
48 SUPPORT MEMBER
51 BEVELED PORTION
G GAP
P1 FRONT SIDE
P2 BACK SIDE
P3 END SURFACE
P4 BEVELED SURFACE
P5 OUTER CIRCUMFERENTIAL SURFACE
P6 FRONT SIDE VIRTUAL SURFACE
P7 BACK SIDE VIRTUAL SURFACE
E SPACE AREA
EA FIRST SPACE AREA
EB SECOND SPACE AREA
EC THIRD SPACE AREA
θ1 ANGLE
θ2 ANGLE

The invention claimed is:

1. A welded structure comprising:
a workpiece; and
a fin member joined to the workpiece by laser welding,
wherein an end of the fin member before laser welding is disposed to face the workpiece, and an installed state of the workpiece and the fin member includes an installed state in which a gap is formed between the workpiece and the fin member,
the fin member has a beveled portion which is beveled at the end facing the workpiece,
the fin member has a front side, a back side formed on an opposite side of the front side, an end surface of the end facing the workpiece, and a beveled surface of the beveled portion beveled at the end,
a space area formed between the workpiece and the fin member is an area, in a cross-section perpendicular to the traveling direction of the laser welding, that is surrounded by a welding target surface of the workpiece facing the fin member, the end surface facing the welding target surface of the workpiece, the beveled surface of the beveled portion, a front side virtual surface extending to the workpiece side along the front side of the fin member, and a back side virtual surface extending to the workpiece side along the back side of the fin member, and
when a maximum space area in which the space area becomes the maximum is set as Emax, and a minimum space area in which the space area becomes the minimum is set as Emin, the beveled portion is beveled to satisfy the relation of (Emax/Emin)≤5.

2. The welded structure according to claim 1,
wherein when the thickness of the fin member in a thickness direction in which the front side and the back side of the fin member are connected with each other is set as "t", and a formation depth of the beveled portion from the end surface in a direction in which the workpiece and the fin member face each other is set as "a", the beveled portion is beveled to satisfy the relation of a≤t.

3. The welded structure according to claim 1,
wherein when the thickness of the fin member in a thickness direction in which the front side and the back side of the fin member are connected with each other is set as t, and a formation depth of the beveled portion from the front side in the thickness direction is set as b, the beveled portion is beveled to satisfy the relation of b≥t/2.

4. The welded structure according to claim 1,
wherein the workpiece is a conical nozzle body having an outer circumferential surface, and
the fin member is an annular sheet metal member that is disposed along the outer circumferential surface of the conical nozzle.

5. The welded structure according to claim 1,
wherein the laser beam emitted to the beveled portion in the laser welding is set such that an angle formed between an irradiation direction of the laser beam and the welding target surface of the workpiece is smaller than an angle formed between the irradiation direction of the laser beam and the front side of the fin member.

6. The welded structure according to claim 1,
wherein the laser beam emitted to the beveled portion in the laser welding is emitted in a predetermined irradiation range on a front side virtual surface extending to the workpiece side along the surface of the fin member, and
the predetermined irradiation range is a range, in a cross-section perpendicular to the traveling direction of the laser welding, from the center of the front side virtual surface in the direction in which the workpiece and the fin member face each other to the fin member side.

7. The welded structure according to claim 1,
wherein a filler metal used in the laser welding uses the same material as the workpiece.

8. The welded structure according to claim 1,
wherein the filler metal used in the laser welding is fed such that, when the gap becomes the maximum, the welded part formed between the workpiece and the fin member has the same height as the front side of the fin member.

9. The welded structure according to claim 1,
wherein at the time of laser welding of the workpiece and the fin member, the beveled portion is irradiated with the laser beam, and on an opposite side of the irradiation side irradiated with the laser beam with the beveled portion interposed therebetween, a back shield filled with inert gas is formed.

10. The welded structure according to claim 1,
wherein the laser welding is penetration welding.

11. The welded structure according to claim 1,
wherein welding with no welding rod is performed on the welded part formed between the workpiece and the fin member by the laser welding, from the opposite side of the irradiation side of the laser beam emitted at the laser welding.

12. A laser welding device for manufacturing the welded structure according to claim 1, wherein the welded structure is manufactured by making a workpiece and an end of a fin member face each other, applying a laser beam between the workpiece and the fin member, and joining the workpiece and the fin member.

* * * * *